United States Patent [19]

Fangrow, Jr.

[11] Patent Number: 4,872,641

[45] Date of Patent: Oct. 10, 1989

[54] GAS PRESSURE REGULATOR MOUNTING YOKE

[75] Inventor: Thomas F. Fangrow, Jr., Corona, Calif.

[73] Assignee: Life Support Products, Inc., Irvine, Calif.

[21] Appl. No.: 223,161

[22] Filed: Jul. 22, 1988

[51] Int. Cl.[4] .......................... F16K 51/00; F16L 5/00

[52] U.S. Cl. .................................... 251/148; 251/143; 285/198

[58] Field of Search ................ 285/198; 251/148, 143; 137/15, 315

[56] References Cited

U.S. PATENT DOCUMENTS

| | | | |
|---|---|---|---|
| 1,687,768 | 10/1928 | Heidbrink | 285/198 |
| 2,950,895 | 8/1960 | Anderson | 251/148 |
| 3,147,761 | 9/1964 | Lecocq | 251/148 |
| 3,195,561 | 7/1965 | Sovitzky | 251/148 |
| 4,015,865 | 4/1977 | Kongelka | 285/198 |
| 4,020,863 | 5/1977 | Fabish | 137/505.25 |

FOREIGN PATENT DOCUMENTS

| | | | |
|---|---|---|---|
| 1076528 | 7/1967 | United Kingdom | 285/198 |

OTHER PUBLICATIONS

A Sheet From Mada Medical Products, Inc. Publication Entitled High Flow Regulators, Mada Medical Products, Inc., Carlstadt, N.J., 1984.

*Primary Examiner*—A. Michael Chambers
*Attorney, Agent, or Firm*—Knobbe, Martens, Olson & Bear

[57] ABSTRACT

A flat plate is die cut into a desired shape that is then bent into the shape of a closed loop yoke for mounting a pressure regulator on the end of a compressed gas cylinder. The yoke is clamped in that shape by a threaded bushing extending through holes in overlapping end segments. Index pins formed in the die cut plate are bent from the plane of the plate to extend into the interior of the yoke.

12 Claims, 1 Drawing Sheet

GAS PRESSURE REGULATOR MOUNTING YOKE

FIELD OF THE INVENTION

This invention relates to gas pressure regulators which are mounted on cylinders containing compressed gas, such as emergency oxygen, and more particularly relates to a yoke which is connected to the regulator and utilized for mounting the regulator on the valve outlet end of a cylinder. The invention further relates to a method of making such a yoke.

BACKGROUND OF THE INVENTION

Various types of compressed gas including breathing oxygen are distributed in cylinders under pressures that are higher than those at which the gas is normally used. The user applies to the valved end of the cylinder a gas pressure regulator assembly to reduce pressure. The assembly includes a mounting yoke which clamps onto the cylinder valve structure and connects the compressed gas to the regulator upon opening a valve. Tubing for conducting the gas to the end user of the gas at a desired pressure is connected to the regulator outlet.

When the cylinder of gas is empty, the regulator assembly is removed, the gas cylinder is returned to the supplier of the gas for refilling, while the regulator is available for use on another filled cylinder. Because of this refilling and reusing distribution procedure, it is important that a regulator be quickly and easily mounted on a cylinder in emergency situations by a variety of personnel having greatly differing degrees of familiarity with the equipment and manipulative skill in operating it. The regulator assemblies must, therefore, be easy to operate and yet be rugged and durable for many years of use, including repeated mountings and dismountings to the gas cylinders. Because it is critical that the proper gas be utilized with a particular regulator and patient, each cylinder is provided with indexing holes in which indexing pins in the mounting yoke must fit before the yoke can be clamped in position.

The Compressed Gas Association, Inc. has established precise standards concerning the pin indexed yoke construction and the size and location of the pins, as well as other requirements. Similarly, an international organization specifies requirements for yoke and regulator construction. Examples of these are set forth in a document identified as ISO 407-1983(E). Some of these requirements are: (1) a gas tight seal shall only be possible when the pins in the yoke correspond to the holes in the valve; (2) when the pins in the yoke do not correspond to the holes in the valve, a gas tight seal shall not be possible and damage to the yoke or the valve shall be prevented; (3) pins shall not be removable or assembled in such a manner that they can become loose in service; (4) the yoke shall be able to resist, without permanent deformation, the load resulting from a specified torque applied to the valve clamping screw or locking device; and (5) the dimensions of the yoke shall limit the movement of the valve in the yoke to a maximum of 6° about the vertical axis prior to pin engagement.

Typically, regulator yokes have a rectangular U-shaped or closed loop construction that fits onto a mating valve outlet on the cylinder. One end of the yoke is attached to the regulator, and the other end of the yoke typically includes a large hand-manipulatable clamping screw by which the yoke and the regulator are tightly clamped to the cylinder. The prior art yokes are made in various ways, but seem to fall into three categories. Perhaps most commonly, the yokes are forged or cast into the basic closed rectangular loop-shape and various machining operations are then performed. This includes drilling and tapping one end of the yoke in which to mount the clamping screw, drilling a hole in the base end of the yoke for connection to a regulator stem, drilling one or more indexing pin holes in the base end of the yoke, and installing the indexing pins, usually in a press fit operation. With many yokes of this type, the process is completed with a plating or other finishing step. While yokes of this type have proven to be rugged and reliable, they are relatively expensive from a standpoint of manufacturing labor and materials. Also, the tapped threads for receiving the clamping screw are ruined after a period of time because of wear and excess clamping force, with the result that the entire yoke is discarded.

Another type of yoke construction which represents a cost improvement over the cast-type is that initially made by extrusion. An example of this is illustrated in U.S. Pat. No. 4,020,863—Fabish. In that construction, a length of yoke is extruded with the desired U-shaped cross section. Individual yokes are then sliced from this extrusion, and the closed end of the U-shaped yoke is drilled and tapped for receiving the clamping screw. The open ends of the yoke are attached directly to the regulator body by suitable fasteners. Indexing pin holes are drilled in the regulator body, and pins press fit therein. While the extruded construction is relatively cost-effective from a fabrication standpoint, it is less versatile in that the regulator body is limited to use with a yoke of that type. By contrast, those yokes having the closed loop construction can be removed relatively easily from the regulator such that the regulator may be used in connection with a completely different type of connecting structure employing a nut-type tightened nipple construction, sometimes referred to as a "bull nose."

A third type of yoke construction is that which is totally machined, either separate from or integral with a regulator body. For example, in one construction, the yoke is formed by machining a large opening in cylindrical stock with the closed loop opening corresponding to the desired size for the yoke. It is then necessary to drill and tap threads in the handle end for receiving the clamping stem handle and to drill holes in the base end for receiving indexing pins, which then have to be installed as an additional step. As an alternate variation of the machine construction, the clamping screw receiving hole is not tapped, but instead, a tubular bolt or bushing is mounted in the hole and held in position by a nut. The bolt is internally threaded to receive the clamping screw. This machined construction has certain advantages over the cast or forged approach, but is not separatable from the regulator, such that the regulator cannot be used with the other mounting device referred to above.

Because of the large volume of regulator yokes being marketed and the competitive nature of the business, a need exists for an improved, less expensive construction that nevertheless meets all of the various requirements for ruggedness, durability and safety, and also has versatility that permits the regulator to be readily separated from the yoke.

SUMMARY OF THE INVENTION

Briefly stated, the invention comprises an improved yoke for mounting a pressure regulator on a compressed gas cylinder, wherein the yoke is formed from a flat plate of a strong but lightweight bendable material, such as aluminum, and of a thickness to provide the needed strength. The plate is die cut into a desired shape and bent into the desired end use configuration. In the die-cutting, a hole is formed in the mid-section of the plate for receiving a pressure regulator stem. Projections are formed in the plate adjacent the hole with such projections ultimately forming indexing pins. The ends of the plate are each formed with a hole for receiving a yoke clamping screw. After the one-step die-cutting operation, the strip is preferably bent into a finished rectangular loop shape in three simple steps. First, the ends of the strip are bent 90° relative to the midsection to form a U-shape, with the section of the plate around the central hole becoming the base or regulator end of the yoke. Simultaneously, the projections adjacent the central hole are bent 90°, with respect to the base wall, to form integral indexing pins adapted to fit within indexing holes in a compressed gas outlet structure.

One free end segment of one leg of the U-shape is then bent inwardly 90° to form the stem receiving wall on one end of the loop. The outer segment of the other leg is then bent inwardly so that the ends of the strip are placed in overlapping relation with the two screw receiving holes are aligned. A tubular bolt or bushing is inserted through the overlapping end holes and held in position by a suitable nut, thereby fixing the yoke in its basic end use loop shape. The tubular nut is previously threaded to receive the screw for clamping the yoke to a compressed gas cylinder outlet valve structure.

DETAILED DESCRIPTION OF A PREFERRED EMBODIMENT OF THE INVENTION

Figure 1:
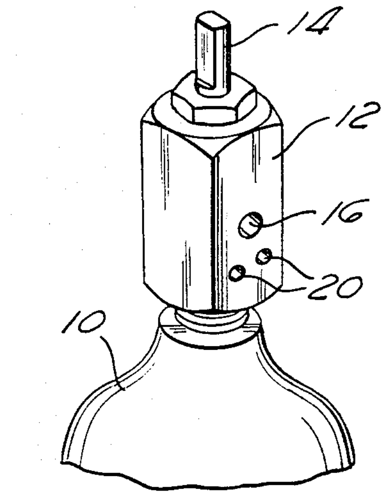
Fig. 1 (PRIOR ART)
FIG. 1 is a schematic perspective view of the upper portion of a prior art cylinder for containing compressed breathing gas.
Figure 2:
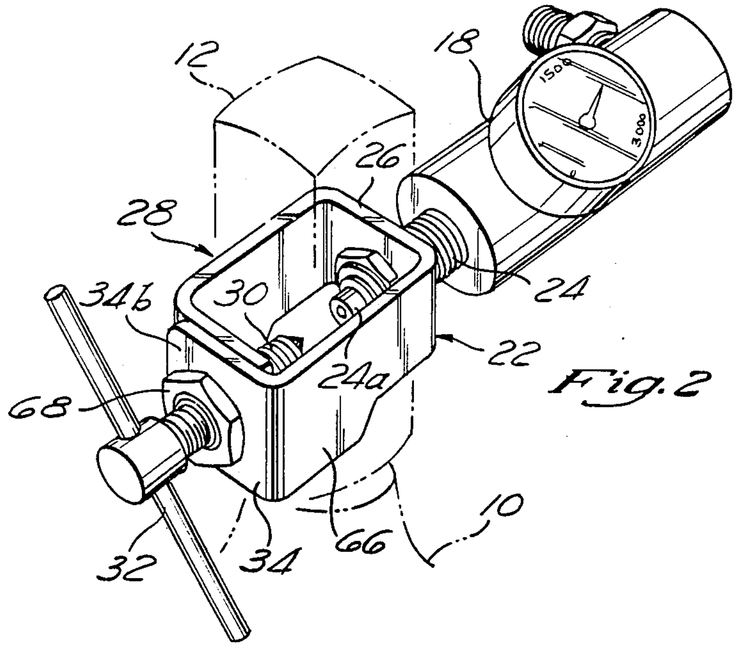
FIG. 2 is a perspective schematic view of a pressure regulator assembly utilizing the yoke assembly of the invention mounted on the upper end of the cylinder of FIG. 1.

Referring first to FIGS. 1 and 2, a compressed gas cylinder 10 is shown having an outlet valve structure 12 in its upper end which includes an internal valve (not shown) and a valve stem 14 adapted to cooperate with a valve handle (not shown). The valve structure 12 is a schematic representation of a typical prior art oxygen tank and it includes a gas outlet 16 for cooperating with a pressure regulator 18. The valve structure 12 further includes a pair of indexing pin receiving holes 20. A yoke assembly 22 is connected to an axially extending stem 24 on the regulator 18, with the stem extending through the base or end wall 26 of a yoke 28. As seen from FIGS. 2 and 4, the yoke 28 has a generally rectangular closed loop configuration sized to fit over the upper end of the cylinder valve structure. A stem 30 of a T-shaped handle 32 extends through a handle end wall 34 of the yoke to fit within a mating dimple (not shown) in the sidewall of the valve structure 12. By tightening the handle 32, the yoke 28 carrying the regulator 18 is tightly clamped onto the valve structure 12 with the tip **24*a* of the stem 24 mating in sealing engagement with the valve outlet 16**.

Figure 3:
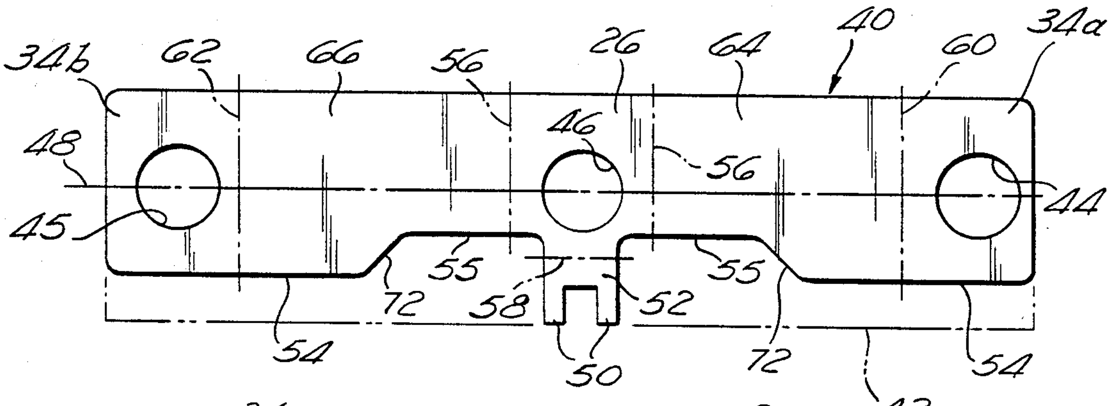
FIG. 3 is a plan view of a die cut plate from which the yoke of the invention is formed.

In accordance with the invention, the yoke is made by die cutting it from a flat plate and bending the plate into the desired shape. FIG. 3 illustrates a flat plate 40 after it has been cut from a rectangular plate 42 illustrated by a portion of the outline of the plate 40 and by the broken lines completing the rectangular shape. The end segments **34*a* and 34*b* of the plate 40 are each formed with a handle stem receiving hole 44 and 45, respectively. The plate is also formed with a hole 46 in its midsection fo receiving the stem 24 on the regulator 18. These holes are aligned such that a centerline 48** extends through the center of each of the holes.

A pair of spaced indexing pins 50 are located in the midsection of the plate adjacent to the regulator mounting hole 46 with the pins projecting from a tab 52 transversely towards one side edge of the plate. As can be seen, portions of the original plate 42 have been cut away on both sides of the indexing pins extendings towards the ends of the plate such that the width of the ends 54 of the plates is less than the transverse distance across the midsection of the plate at the location of the indexing pins. As also seen, portions of the plate immediately on either side of the indexing pins have been cut away more deeply than at the ends of the plate creating sections 55 or reduced width. These sections facilitate bending of the projecting pins 50.

Figure 4:
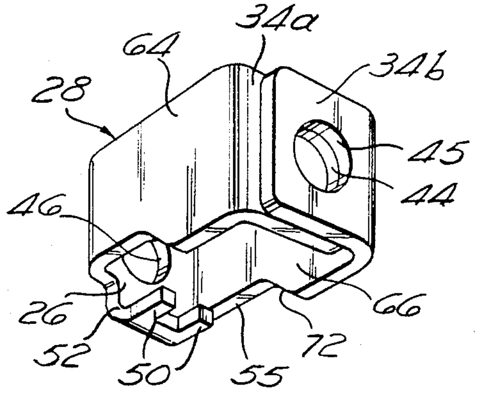
FIG. 4 is a perspective view of the yoke of the invention formed from the flat plate of FIG. 3.

A pair of bend lines 56 are shown in FIG. 3 on opposite sides of the central hole 46 to represent lines about which the plate is bent in forming the yoke. These two bend lines define what becomes the end wall 26 of the yoke 28. An additional bend line 58 is shown extending across the tab 52 from which the index pins 50 project, with that line being generally perpendicular to the bend lines 56 defining the end wall. In a first fabrication step after die cutting the plate 40, the plate sections extending outwardly from the bend lines 56 are bent 90° out of the plane of the paper as illustrated in FIG. 3. This creates a general U-shape, with smoothly rounded corners and with the closed end portion of the U-shape forming the end wall 26 of the yoke 28. Simultaneously, or immediately preceding or succeeding, the index pin tab 52 is bent 90° about the bend line 58 so that the index pins extend away from the base, as seen in FIG. 4.

As a next step, the end segment **34*a* of one leg of the U shape is bent inwardly approximately 90° about a bend line 60 to close the upper portion of the U shape and to form a first segment 34*a* of the yoke handle end wall 34. Following this, the other end segment 34*b* of the U shape is bent inwardly approximately 90° about the bend line 62 to form a second segment 34b of the handle end wall 34 in overlapping face-to-face engagement with the first segment 34*a*. The sections of the plate between the inner bend lines 56 and the outer bend lines 60 and 62 define spaced, large, flat, generally parallel side walls 64 and 66 of the yoke. These walls are generally rectangular except for the cutouts in the corner adjacent to index pins. The index pins are in the approximate plane of the wall edges. This completes the yoke, providing it a closed loop configuration with smoothly rounded corners at the bend lines, which is open in two opposite sides between the walls 64 and 66 to fit onto the cylinder valve structure 12**.

Figure 5:
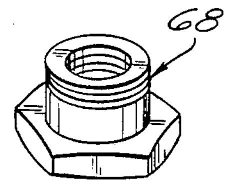
FIG. 5 is a perspective view of an internally threaded bushing.
Figure 6:
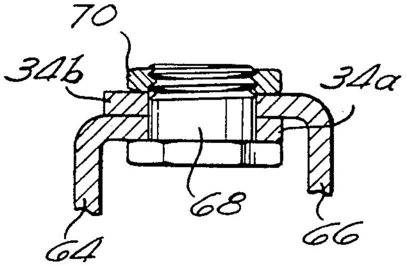
FIG. 6 is a cross-sectional view of the overlapping end segments of the yoke showing the bushing of FIG. 5 in combination with a nut clamping the end wall segments together.

The holes 44 and 45 in the end wall segments 34a and 34*b* are of course axially aligned. It is necessary to clamp the segments tightly together in face-to-face engagement to provide strength and stability to withstand the forces encountered when the yoke is clamped tightly onto the valve structure on the cylinder. For this purpose, the bushing 68 of FIG. 5 is inserted through the holes in the end wall segments, and a nut 70 is threaded onto the end of the bushing tightly holding the segments against each other. The interior of the bushing or tubular bolt is threaded to receive the threaded stem 30 of the T-shaped handle 32. Thus, it can be seen that the bushing and nut perform a dual function by holding the end wall segments together and by supporting the handle. Advantageously, the bushing and the nut can be replaced, if the threads should become worn or stripped through use, thus enabling the yoke 28 to be reused with a new bushing and nut. It should be appreciated, however, that the end segments 34*a* and 34*b* can be held together by other suitable means.

While the yoke can of course be made of various dimensions, it may be helpful to appreciate the nature of the invention to consider the material and dimensions of a preproduction version of the yoke. The plate 40 is preferably made of an aluminum alloy identified as 5052-34. The width of the plate in the area of the end portions is about 1.187 inch. The distance from the end of the lower or inner end wall segment 34*a* to the exterior of the sidewall to which that segment is formed integral with is about 1" and the similar distance from the edge of the other or upper end wall segment 34*b* is slightly greater than this. The sidewalls have a minimum width at the reduced portion 55 of about $\frac{7}{8}$ inch with the narrower section 55 of the sidewall being joined to the wider section 54 by a connecting portion 72 which extends at an angle of about 45°.

I claim:

1. A yoke assembly for mounting a pressure regulator on a gas cylinder outlet valve structure, comprising:

a yoke with a closed loop configuration having a pair of spaced, generally flat, parallel side walls defining open sides to enable the yoke to fit on said structure;

a regulator base integrally joined to said walls; a hole in said base for attachment of said yoke to said regulator;

one or more indexing pins formed integral with said base, said pins being bent from the base to extend generally perpendicular to said base and being adapted to fit within indexing holes formed in said valve structure on said cylinder; and a handle end wall spaced from and extending generally parallel to said base, and joined to said side wall, said handle end wall being adapted to receive a stem of a handle for attaching said yoke to said cylinder structure, wherein said side walls, said base, said handle end wall, and said pins are of a one-piece construction.

2. The yoke assembly of claim 1, wherein said handle end wall includes a flat segment formed integral with one of said side walls and a flat segment formed integral with the other of said side walls, with said segments being positioned in face-to-face relation whereby said handle end wall has a double thickness.

3. The assembly of claim 2, wherein said 'segments each include a hole formed therethrough for receiving said handle stem, and said segment holes are aligned with each other.

4. The assembly of claim 3, including a tubular bushing extending through said aligned holes and a nut threaded onto one end of said bushing to clamp said segments tightly in face-to-face engagement, said bushing being internally threaded to receive said handle stem.

5. The assembly of claim 1, wherein said side walls are generally rectangular except for having a cutout in their corners adjacent to said indexing pins, and said indexing pins extend generally in a plane with the adjacent side wall edges.

6. The assembly of claim 1, wherein said yoke base and said side walls are joined by smoothly rounded corners, said corners, formed by bending the side walls and the base from a single flat plate, and said index pins are formed from said plate and are joined to said base by smoothly rounded corners, said corners formed by bending said index pins relative to said base.

7. The assembly of claim 6, wherein said handle end wall is a wall segment integral with one of said side walls by a smoothly rounded corner, said corner created by bending the segment from said single flat plate, and a second segment integral with said other side wall by a smoothly rounded corner, said corner formed by bending said second segment from said single flat plate.

8. A yoke for mounting a pressure regulator on a gas cylinder valve structure, comprising:

a one-piece, flat, generally rectangular plate, having a hole therethrough on opposite ends of the plate and having a hole through a central portion of said plate, with the holes being generally aligned in a row; and a pair of spaced projections located adjacent to said central hole, said projections extending transversely away from said central hole; said plate being made of a material and thickness adapted to be bent such that portions of the plate on each side of said central hole can withstand the stress of bending generally perpendicular to a base portion of the plate surrounding said central hole, and said projections can withstand the stress of bending generally perpendicular to said base to form index pins, and the segments of said plate through which said end holes are formed can withstand the stress of bending generally perpendicular to their adjacent plate sections and generally parallel to said base in overlapping face-to-face engagement so that the plate when fully bent in the manner described has a closed loop configuration.

9. A yoke assembly for mounting a pressure regulator on a gas cylinder outlet valve structure, comprising:

a yoke with a closed loop configuration having a pair of spaced, generally flat, parallel side walls defining open sides to enable the yoke to fit on said structure;

a regulator base integrally joined to said walls;

a hole in said base for attachment of the yoke to said regulator;

one or more indexing pins formed integral with said base being bent form the base to extend generally perpendicular to the end wall and being adapted to fit within indexing holes formed in valve structure on said cylinder; and a handle end wall spaced from and extending generally parallel to said base, and joined to said side wall, said handle end wall being adapted to receive a stem of a handle for attaching said yoke to said cylinder structure, wherein said handle end wall includes a flat segment formed integral with one of said side walls and a flat segment formed integral with the other of said side walls, with said segments being positioned in face-to-face relation whereby said handle end wall has a double thickness.

10. The assembly of claim 9, wherein said segments each include a hole formed therethrough for receiving said handle stem, and said segment holes are aligned with each other.

11. The assembly of claim 10, including a tubular bushing extending through said aligned holes and a nut threaded onto one end of said bushing to clamp said segments tightly in face-to-face engagement, said bushing being internally threaded to receive said handle stem.

12. A yoke assembly for mounting a pressure regulator on a gas cylinder valve structure, including a yoke formed by bending a one piece planar plate having a hole therethrough on opposite ends of said plate and having a hole through a central portion of said plate, with said holes being substantially colinear; and a pair of spaced projections located adjacent to said central hole, the projections extending transversely away from said central hole, wherein said bending includes bending about a first and second bend line portions of the plate on each side of said central hole generally perpendicular to a base portion of said plate surrounding said hole; bending about a third bend line said projections generally perpendicular to said base to form index pins; and bending about a fourth and fifth bend line the segments of said plate through which said end holes are formed generally perpendicular to their adjacent plate sections and generally parallel to said base in overlapping face-to-face engagement so that upon completion of said bending, said plate has a closed loop configuration.

* * * * *